(12) United States Patent
Farhan

(10) Patent No.: US 6,356,369 B1
(45) Date of Patent: Mar. 12, 2002

(54) DIGITAL OPTICAL TRANSMITTER FOR PROCESSING EXTERNALLY GENERATED INFORMATION IN THE REVERSE PATH

(75) Inventor: Forrest M. Farhan, Duluth, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 0 days.

(21) Appl. No.: 09/255,183

(22) Filed: Feb. 22, 1999

(51) Int. Cl.[7] .......................... H04J 14/02; H04J 14/00; H04B 10/20; H04B 10/00
(52) U.S. Cl. ................. 359/125; 359/137; 359/118; 359/115; 359/154; 359/167; 359/173
(58) Field of Search ................................ 359/167, 118, 359/113, 123, 125, 115, 124, 173

(56) References Cited

U.S. PATENT DOCUMENTS

| | | | |
|---|---|---|---|
| 3,995,120 A | 11/1976 | Pachynski, Jr. ............. | 179/15 |
| 4,759,018 A | 7/1988 | Buchner ..................... | 370/112 |
| 5,018,142 A | 5/1991 | Simcoe et al. .............. | 370/112 |
| 5,202,780 A | * 4/1993 | Fussganger ................. | 359/125 |
| 5,361,091 A | 11/1994 | Hoarty et al. .............. | 348/7 |
| 5,420,583 A | 5/1995 | Knecht ....................... | 341/59 |
| 5,563,815 A | 10/1996 | Jones ......................... | 364/721 |
| 5,694,232 A | 12/1997 | Parsay et al. .............. | 359/113 |
| 5,706,111 A | * 1/1998 | Morales et al. ............ | 359/125 |
| 5,859,895 A | * 1/1999 | Pomp et al. ................ | 379/29 |

* cited by examiner

*Primary Examiner*—Leslie Pascal
*Assistant Examiner*—M. R. Sedighian
(74) *Attorney, Agent, or Firm*—Hubert J. Barnhardt, III; Kenneth M. Massaroni; Shelley L. Couturier

(57) ABSTRACT

A cable television system (100) for transmitting information in forward and reverse directions includes forward and reverse paths over which information is transmitted and a reverse path transmitter (305) and a reverse path receiver (405), both located in the reverse path. The reverse path transmitter (305) receives an analog electrical signal and an external digital signal from an external source, such as a PCS terminal or router. The transmitter (305) then generates a single digital bit stream from the external digital signal and the digital electrical signal and transmits the single digital bit stream modulated at a first wavelength over a fiber optic communication medium (110) that couples the transmitter (305) and the reverse path receiver (405). The reverse path receiver (405) receives and demodulates the single digital bit stream to regenerate the digital electrical signal and the external digital signal, converts the digital electrical signal to the analog electrical signal for processing within the cable television system (100), and forwards the external digital signal for processing by a second external source outside the cable television system (100).

6 Claims, 2 Drawing Sheets

DIGITAL OPTICAL TRANSMITTER FOR PROCESSING EXTERNALLY GENERATED INFORMATION IN THE REVERSE PATH

RELATED APPLICATIONS

This patent application is related to U.S. patent application. Ser. No. 09/169,612 entitled "Digital Optical Transmitter" by Forrest M. Farhan, filed on Oct. 9, 1998 and assigned to the assignee hereof.

FIELD OF THE INVENTION

This invention relates generally to cable television systems using fiber optic communications, and more specifically to cable television systems having both forward and reverse information transmission using fiber optic communications.

BACKGROUND OF THE INVENTION

Cable television systems typically include a headend section for receiving satellite signals and demodulating the signals to an intermediate frequency (IF) or baseband. The down converted signal is then modulated with radio frequency (RF) carriers and converted to an optical signal for transmission from the headend section over fiber optic cable. Optical transmitters are distributed throughout the cable system for splitting and transmitting optical signals, and optical receivers are provided at remote locations for receiving the optical signals and converting them to radio frequency (RF) signals that are further transmitted along branches of the system over coaxial cable rather than fiber optic cable. Taps are situated along the coaxial cable to tap off the cable signals to tap off downstream (also referred to as "outbound" or "forward") signals to subscribers of the system.

Various factors influence the ability to accurately transmit and receive optical signals within a cable television system. As the length of fiber optic cable within a system increases, for example, signal losses also increase. Furthermore, temperature fluctuations, which cause variation in the optical modulation index of the optical transmitter, can result in variation of the radio frequency (RF) output level of the optical receiver. Signal distortions can be caused by non-linearities in the laser and photodiode of the optical transmitter.

Although these problems can be mitigated by employing expensive techniques, e.g., decreasing fiber lengths between optical nodes, such techniques may prohibitively increase costs to both subscribers and service providers. Thus, what is needed is a better way to provide reliable and accurate transmission of optical signals within a cable television system. Furthermore, in such an improved system, there exists an opportunity to transmit externally generated information within an improved cable television system employing a novel reverse path architecture.

DETAILED DESCRIPTION OF A PREFERRED EMBODIMENT

Figure 1:
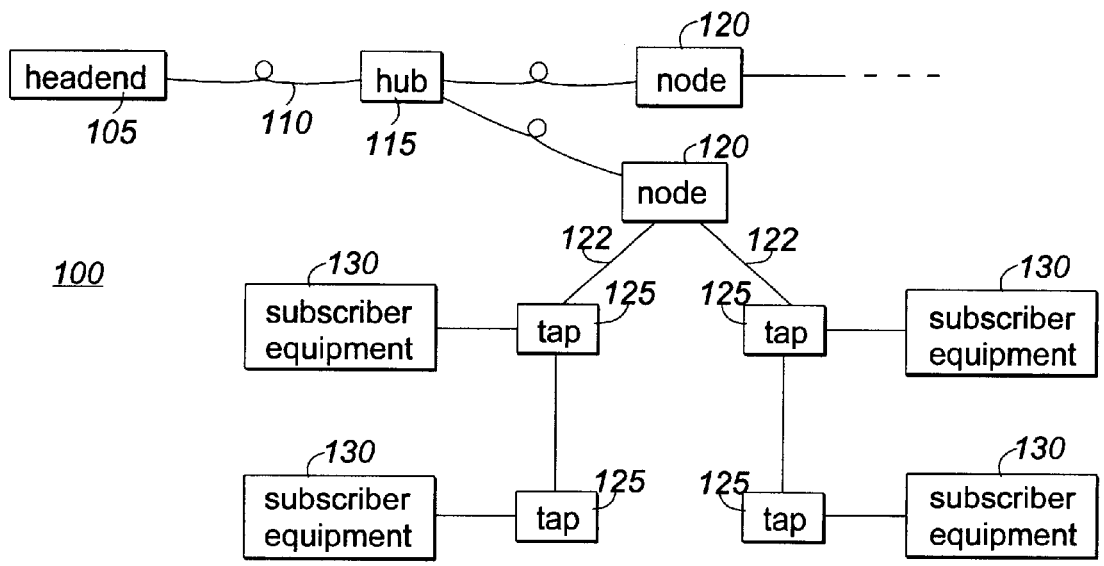
FIG. 1 is a block diagram of a conventional cable television system in accordance with the present invention.

FIG. 1 shows a communications system, such as a cable television system 100 that can have both forward and reverse paths, i.e., the ability to communicate downstream in the forward direction and upstream in the reverse direction. The cable television system 100 includes headend equipment 105 for receiving satellite signals that are demodulated to baseband or an intermediate frequency (IF). The baseband signal is then converted to cable television signals that are routed throughout the system 100 to subscriber equipment 130, such as set top decoders, televisions, or computers, located in the residences or offices of system subscribers. The headend equipment 105 can, for instance, convert the baseband signal to an optical signal that is transmitted over fiber optic cable 110. In a larger system, one or more hubs 115 forward the optical signal further throughout the system 100, and remotely located optical nodes 120 convert the optical signal to an electrical radio frequency (RF) signal for further transmission through the system 100 over coaxial cable 122. Taps 125 located along the cable 122 at various points in the distribution system split off portions of the RF signal for routing to subscriber equipment 130 coupled to subscriber drops provided at the taps 125.

The signals transmitted downstream from the headend equipment 105 to the subscriber equipment 130 are referred to as forward signals. The system 100, as mentioned, can also have reverse transmission capability so that signals, such as data, video, or voice signals, generated by the subscriber equipment 130 can be provided back to the headend 105 for processing. The reverse signals travel through the taps 125 and any nodes 120 and other cable television equipment, e.g., reverse amplifiers and hubs 115, to the headend 105. In the configuration shown in FIG. 1, RF signals generated by the subscriber equipment 130 travel to the node 120, which converts the RF signals to optical signals for transmission over the fiber optic cable 110 to the headend 105. The forward signals are typically separated from the reverse signals by frequency division multiplexing. In North America, forward signals are usually carried in the 50–750 MHz band, and reverse signals are carried in the 5–40 MHz band.

In conventional cable television systems, optical links in the reverse path use amplitude modulation to directly modulate a laser generating a reverse optical signal. As a result, RF output level of the optical receiver is directly dependent upon the optical modulation index (OMI), which in turn is directly related to the RF drive current, the laser threshold current, and the laser bias current of the laser located in any optical transmitters. Since the laser bias and threshold currents vary with temperature, which in turn causes temperature variations of the OMI, the RF output level of the optical receiver also varies with temperature.

Prior art optical transmission that uses AM modulation also results in a system in which the linearity of the received optical signal is directly dependent upon the linearity of the transmitting laser and the receiving photodiode. Therefore, non-linearities of those devices can greatly degrade the performance of the reverse path system. Additionally, the non-linear conversion processes of lasers and photodiodes in conventional systems vary with temperature, thus further degrading the performance.

U.S. patent application Ser. No. 09/169,612 attorney's docket no. A-5219 to Farhan, entitled "Digital Optical Transmitter" and filed on Oct. 9, 1998 ("Farhan"), which is assigned to the assignee hereof and which is hereby incorporated by reference, teaches the use of digital optical transmitters and receivers in the reverse path of a cable television system to minimize or even eliminate the problems of the prior art.

In Farhan, the laser within an optical transmitter in the cable television system reverse path is digitally modulated so that the RF level information is encoded according to a bit stream; as a result, variations in the OMI, the laser bias current, the laser threshold current, and the temperature do not affect RF output levels of the optical receiver. Additionally, the digital optical system, i.e., the digital optical transmitter and the digital optical receiver, of Farhan only generates and resolves two amplitude levels rather than a continuum of levels. As a result, linearity requirements of the laser and photodiode are significantly reduced, which results in better performance and less expense. Still another advantage of the digital optical transmitter and receiver of Farhan is that the cable system can, without significant cost or performance penalties, employ an architecture in which fiber stretches deeper into the system. As a cable television signal travels along a fiber optic cable, the signal-to-noise ratio decreases as a result of laser noise, Rayleigh backscattering, photodiode shot noise, receiver amplifier noise, unmodulated Fabry-Perot sporadic noise, and post amplifier intrinsic noise. Conventionally, this problem has been mitigated by driving the transmitter laser with more power and/or increasing the receive sensitivity of the receiver photodiode at great expense. However, this need not be done in the system of Farhan since the noise sources and corresponding signal degradation resulting from increased fiber lengths does not affect recovery of information to the same extent as in prior art systems.

Figure 2:
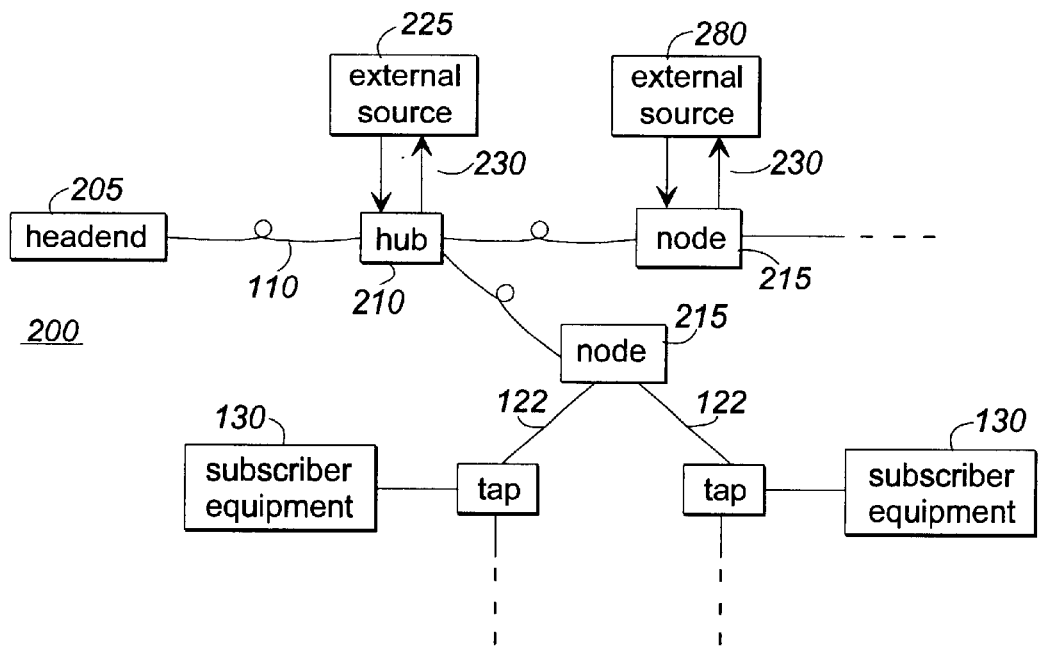
FIG. 2 is a block diagram of a cable television system in accordance with the present invention.

Given the advantages of the cable television system of Farhan, there exists an opportunity to efficiently and rapidly process externally generated transmission within a cable television system according to the present invention. Referring to FIG. 2, a cable television system 200 having both forward and reverse paths in accordance with the present invention is shown. The cable television system 200 includes headend equipment 205 for receiving satellite signals that are demodulated to baseband or an intermediate frequency (IF). The baseband signal is then converted to cable television signals that are routed throughout the system 200 to subscriber equipment 130, such as set top decoders, televisions, or computers, located in the residences or offices of system subscribers. The headend equipment 205 can, for instance, convert the baseband signal to an optical signal that is transmitted over fiber optic cable 110. In a larger system, one or more hubs 210 forward the optical signal deeper into the system 200, and remotely located optical nodes 215 convert the optical signal to an electrical radio frequency (RF) signal for further transmission through the system 200 over coaxial cable 122. Taps 125 located along the cable 122 at various points in the distribution system split off portions of the RF signal for routing to subscriber equipment 130 coupled to subscriber drops provided at the taps 125.

The system 200 also has reverse transmission capability so that signals, such as data, video, or voice signals, generated by the subscriber equipment 130 can be provided back to the headend 205 for processing. The reverse signals travel through the taps 125 and any nodes 215 and other cable television equipment, e.g., reverse amplifiers and hubs 210, to the headend 205.

Furthermore, in accordance with the present invention, the cable television system 200 has the ability to process and transmit externally generated digital signals, e.g., digital signals generated by a first external source 225 and intended for reception by a second external source 280. A first external source device 225 could be, for example, a personal communications services (PCS) device comprising a remote terminal or base station that transmits and receives information to and from another external system, such as a paging system, via over-the-air signals. A second external source device 280 could be, for instance, a switching remote digital terminal or router coupled to another system, such as the Public Switched Telephone Network (PSTN) or the Internet, respectively. Other examples of external sources 225, 280 include next generation digital loop carrier (NGDLC) devices. The external sources 225, 280 can be coupled into the cable television system 200 by any communication media 230, including, for example, coaxial cables or fiber optic cables.

Generally, communications between headend equipment 205, hubs 210, and/or nodes 215 involve optical transmissions over fiber optic communication channels. Additionally, according to the present invention, reverse optical communications are digital, as opposed to analog, in nature. Therefore, reverse path digital optical transmitters can be located in any of the nodes 215 and hubs 210, and reverse path digital optical receivers can be located in any of the hubs 210 and the headend equipment 205. In accordance with the present invention, reverse path communications via digital optical transmitters and receivers can be used to process information between the external sources 225, 280.

Figure 3:
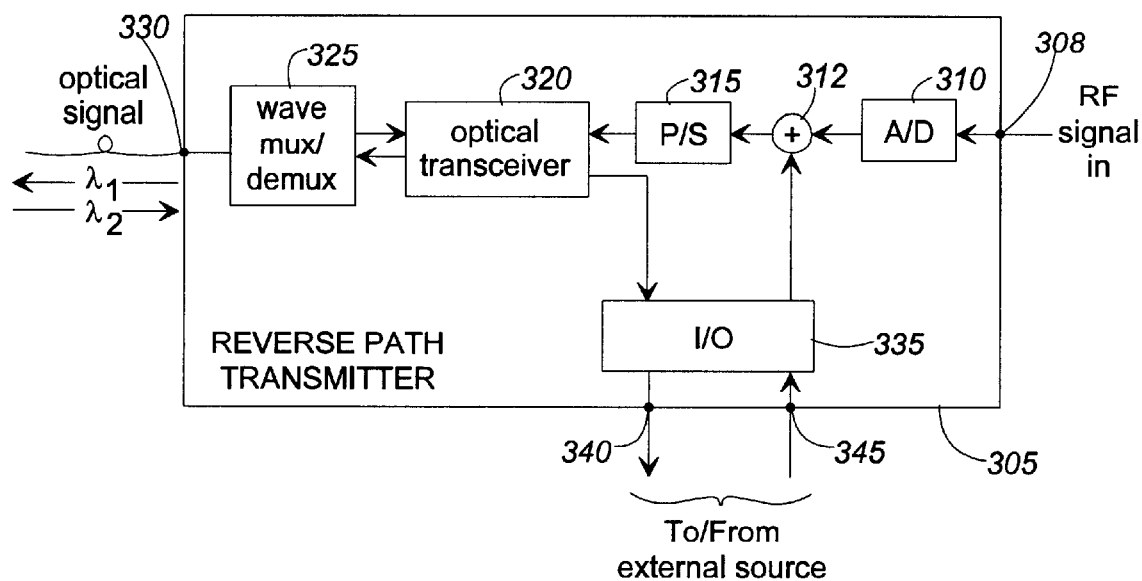
FIG. 3 is an electrical block diagram of a digital optical transmitter for transmitting in the reverse path of the cable television system of FIG. 2 in accordance with the present invention.

FIG. 3 shows a digital optical transmitter 305 that can be used in the reverse path of the cable television system 200 and that is preferably located in the nodes 215, the hubs 210, or both.

It will be appreciated that other conventional circuitry, such as forward signal processing, timing circuitry, etc., will typically be used in conjunction with the digital optical transmitter 305, depending upon the type of device in which the transmitter 305 is included. The transmitter 305 receives, at an input 308, an analog information signal that is representative of one or more reverse RF signals from the subscriber equipment 130. The transmitter 305 can also receive and forward, at terminals 340, 345, externally generated signals such as those provided by PCS or NGDLC devices 225, 280. At its output 330, the transmitter 305 provides a wave division multiplexed digital optical signal that is generated in accordance with the analog information signal as well as any digital signals provided by the external sources 225, 280.

More specifically, the digital reverse transmitter 305 includes an analog-to-digital (A/D) converter 310 for converting the analog input to a digital electrical signal, i.e., a digital word comprising a particular number of bits, in a conventional manner. The resolution of the A/D converter 310, of course, is dependent upon signal-to-noise ratio requirements and any other design parameters. The transmitter 305 also includes an input/output interface 335 for transmitting and receiving digital electrical signals to and from the external sources 225, 280 via ports 340, 345.

A summer 312 receives the digital information signal from the A/D converter 310 and the externally generated digital signals and digitally adds the two signals by performing digital interleaving into the overhead time slots. The summed signal is then coupled to a parallel-to-serial (P/S) converter, or a serializer 315, which receives the parallel inputs representative of the multiplexed signal and converts the inputs into a serial bit stream. An optical transceiver 320, generally comprising a laser diode and driver, then generates an optical signal in accordance with the serial bit stream. It will be appreciated that the serializer 315 can also include frame-encoding circuitry for encoding the serialized digital signal into frames of data. The optical signal is then processed by a wave division multiplexer/demultiplexer 325 for multiplexing the optical signal at a first wavelength, $\lambda_1$, for transmission over a fiber optic communication channel. The wave division multiplexing is likely to be necessary in situations where only one fiber optic cable is available for the upstream cable television transmissions.

In accordance with the present invention, the reverse path transmitter 305 can also receive externally generated information, via port 330, in the form of an optical signal modulated at a second wavelength, $\lambda_2$. Such an optically modulated signal is demultiplexed by the wave division multiplexer/demultiplexer 325 and converted by the optical transceiver 320 to an electrical signal, which is then transmitted out of the cable television system 200 to an external source 225, 280 by the input/output interface 335.

Figure 4:
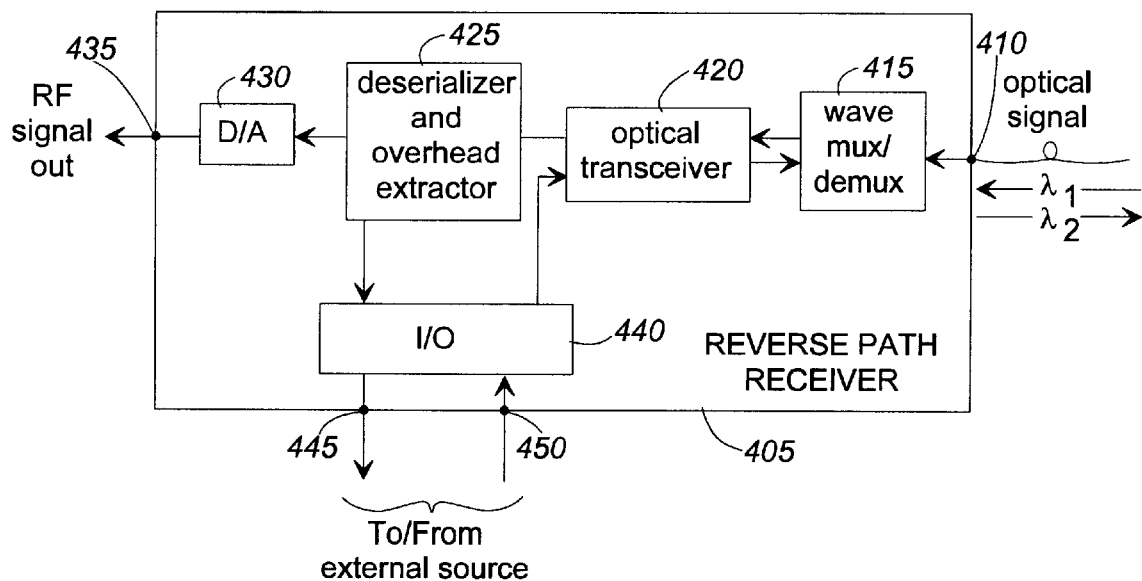
FIG. 4 is an electrical block diagram of a digital optical receiver for receiving reverse path signals transmitted in the reverse path of the cable television system of FIG. 2 in accordance with the present invention.

FIG. 4 is a block diagram of an optical receiver 405 for receiving the digital optical signal transmitted by the optical transmitter 305 at the first wavelength. The receiver 405 includes a wave division multiplexer/demultiplexer 415 for demultiplexing the received signal. An optical transceiver 420, comprising at least a detector, such as a photodiode, receives the demultiplexed optical signal and generates therefrom a serial stream of electrical pulses in accordance with the optical signal.

The output signals provided by the optical transceiver 420 are coupled to a serial-to-parallel (P/S) converter and overhead extractor, i.e., a deserializer, 425 for generating therefrom a set of parallel outputs corresponding to a digital word and for extracting the externally generated information from the cable television information. Internal system information corresponding to the original analog information received at port 308 of the optical transmitter 305 is forwarded for processing by a digital-to-analog (D/A) converter 430 that converts the signal provided at its digital input to an analog signal in a known manner. Thereafter, the analog signal is transmitted at output port 435 for further upstream transmission or processing within the cable television system 200. The externally generated digital signals are provided by the deserializer 425 to an input/output interface 440 that transmits the signals to an external source 225, 280 over port 445.

The external source 225, 280 coupled to ports 445, 450 of the receiver 405 can also provide information for transmission over the fiber optic reverse path of the cable television system 200. When a digital signal is provided by the external source 225, 280, the input/output interface 440 forwards the signal to the optical transceiver 420, which converts the signal to an optical signal. The wave division multiplexer/demultiplexer 415 then multiplexes the signal for transmission at the second wavelength over the fiber optic cable to the digital transmitter 305.

This sharing of the communication channel takes advantage of a cable television hybrid fiber coax digital (baseband) transport scheme and wave division multiplexed transceiver technology to provide a two-way transport in which the return band, e.g., 5–40 MHz for North America, is digitized and carried on an approximately one (1) Gbps digital stream. The return band is preferably digitized using the A/D converter 310 at a sampling frequency higher than twice the highest frequency. In North America, therefore, the sampling frequency should be higher than 80 MHz. The samples are then serialized and transported via a digital laser at a rate, R, given by the following equations:

$$R = N^* F_s + M \quad (1)$$

$$M = O_h + C \quad (2)$$

where N represents the number of bits per sample, $F_s$ represents the sampling frequency, $O_h$ represents the number of overhead bits required for establishing a framing protocol, e.g., OC1 (STS-1) or DS3, and C represents the upstream digital payload, or bit rate, to be carried in the return path. This serial stream is then used to modulate a baseband digital transceiver that transmits at the first wavelength, $\lambda_1$. In the downstream, or forward, direction, the outbound digital payload associated with C digitally modulates the far-end transceiver at wavelength $\lambda_2$. The two wavelengths are optically demultiplexed using- the optical wave division demultiplexers at both receive ends, so only one fiber optic path is required. The remote digital return transmitter, which can be located in a fiber node, can derive its timing from the downstream signal.

In summary, in the cable television system 200, digital signals from external sources 225, 280 can conveniently share resources with the cable television system 200 so that one source 225 can quickly and efficiently communicate with the other source 280 without degrading either the cable television signals or the externally generated signals. As a result, cable service providers can offer digital communications over fiber optic communication channels to other types of service providers, thereby defraying costs. At the same time, other service provides, such as PCS or NGDLC providers, are not required to install dedicated communication channels for communications with other providers. Instead, they can take advantage of cable television systems that are often already in place in most areas of the United States.

It will be appreciated by now that there has been provided a cable television system that can transmit externally generated signals so that communication services can be offered to other service providers.

I claim:

1. A broadband communications system for transmitting information in the forward and reverse directions over, respectively, forward and reverse paths, the broadband communications system comprising:

a reverse path transmitter located in the reverse path for receiving a reverse analog electrical signal, the reverse path transmitter comprising:

an input port for receiving the reverse analog electrical signal;

a converter for converting the reverse analog electrical signal to a digital electrical signal;

an input/output interface for receiving an external digital signal from an external source;

a summer for generating a single digital bit stream from the digital electrical signal and the external digital signal;

an optical transmitter for converting the single digital bit stream to a first optical signal at a first wavelength;

an output port for transmitting the first optical signal upstream in the reverse path, and for receiving a second optical signal at a second wavelength from upstream in the reverse path; and an optical receiver for providing the second optical signal to the input/output interface; and a reverse path receiver located in the reverse path; the reverse path receiver comprising:

an input port for receiving the first optical signal, and for providing the second optical signal;

an optical receiver for converting the first optical signal to the single digital stream;

a deserializer/extractor circuit for recovering the digital electrical signal and the external digital signal from the single digital bit stream, and for routing the digital electrical signal and the external digital signal;

an input/output interface for forwarding the external digital signal to a second external source outside the reverse path receiver, and for receiving and providing a second external digital signal from the second external source;

a converter for converting the digital electrical signal to the reverse analog electrical signal;

an output port for forwarding the reverse analog electrical signal further upstream in the reverse path; and an optical transmitter for converting the second external digital signal to the second optical signal.

2. The broadband communications system of claim 1 further comprising a single optical fiber coupling the reverse path transmitter to the reverse path receiver.

3. The broadband communications system of claim 1, wherein the reverse path transmitter further comprises:

a wave division multiplexer/demultiplexer for multiplexing the first optical signal at the first wavelength, and for demultiplexing the received second optical signal at the second wavelength.

4. The broadband communications system of claim 3, wherein the reverse path receiver further comprises:

a wave division multiplexer/demultiplexer for multiplexing the second optical signal at the second wavelength, and for demultiplexing the received first optical signal at the first wavelength.

5. In a system for transmitting forward signals over a forward path and reverse signals over a reverse path, and for having the ability to transmit externally generated digital signals in both a forward and a reverse direction over the reverse path, the reverse path including an optical transmitter and an optical receiver coupled together with a single optical fiber, a method for transmitting all signals over the reverse path comprising:

in the optical transmitter,
  converting a reverse analog electrical signal to a digital electrical signal;
  providing a single digital stream by interleaving the digital electrical signal with an externally generated digital signal;
  converting the single digital stream to a first optical signal having a first wavelength;
  transmitting the first optical signal to the optical receiver;

in the optical receiver,
  recovering the digital electrical signal and the externally generated digital signal;
  providing the externally generated digital signal to a second external source, and providing the digital electrical signal to a converter;
  recovering the reverse analog electrical signal from the digital electrical signal;
  transmitting the analog electrical signal further over the reverse path;

in the optical receiver,
  receiving a second externally generated digital signal;
  converting the second externally generated digital signal to a second optical signal having a second wavelength; and
  providing the second optical signal to the optical transmitter.

6. The method of claim 5, wherein the steps further comprise:

in the optical transmitter, prior to transmitting the first optical signal,
  multiplexing the first optical signal at the first wavelength; and
  demultiplexing the second optical signal at the second wavelength; and in the optical receiver, prior to providing the second optical signal,
  multiplexing the second optical signal at the second wavelength; and
  demulitplexing the first optical signal at the first wavelength.

\* \* \* \* \*